United States Patent [19]

Leeper

[11] 4,393,914

[45] Jul. 19, 1983

[54] TIRE CHANGER WITH COMBINATION WHEEL CLAMPS AND BEAD LOOSENERS

[75] Inventor: Charles G. Leeper, Antioch, Tenn.

[73] Assignee: Hennessy Industries, Inc., LaVergne, Tenn.

[21] Appl. No.: 266,153

[22] Filed: May 22, 1981

[51] Int. Cl.³ .............................................. B60C 25/06
[52] U.S. Cl. ....................................... 157/1.2; 157/16
[58] Field of Search ..................... 157/1.17, 1.2, 1.26, 157/15–17

[56] References Cited

U.S. PATENT DOCUMENTS

| | | | |
|---|---|---|---|
| 1,575,869 | 3/1926 | Schmidt | 157/1.2 X |
| 2,545,157 | 3/1951 | McCrary | 157/1.2 |
| 2,546,900 | 3/1951 | Miller et al. | 157/1.2 |
| 3,504,727 | 4/1970 | Scott | 157/1.24 |
| 3,556,193 | 1/1971 | Duquesne | 157/1.28 |

FOREIGN PATENT DOCUMENTS

| | | | |
|---|---|---|---|
| 1232182 | 10/1960 | France . | |
| 706756 | 4/1954 | United Kingdom | 157/1.2 |

*Primary Examiner*—James G. Smith
*Attorney, Agent, or Firm*—Wood, Dalton, Phillips, Mason & Rowe

[57] ABSTRACT

A device for clamping a wheel and loosening the bead of a tire having a plurality of converging, movable shoes. The shoes move simultaneously toward the axis of the wheel for engagement of the rim, a tongue is extended from each shoe between the rim and the tire bead to loosen the bead from the wheel whereupon the wheel is clamped between the shoes.

13 Claims, 7 Drawing Figures

TIRE CHANGER WITH COMBINATION WHEEL CLAMPS AND BEAD LOOSENERS

BACKGROUND OF THE INVENTION

1. Field of the Invention

This invention relates to tire changing devices and more particularly those devices which loosen the bead of the tire from a rim and clamp the wheel.

2. Description of the Prior Art

The proliferation of diverse automotive wheel sizes, shapes and styles has necessitated a device capable of not only loosening the bead of a tire mounted on the wheel but also providing a means to hold the wheel securely for the subsequent removal of the tire. Devices which perform the above functions have encountered numerous drawbacks. To operate some wheel clamping and bead loosening devices the operator must clamp the wheel to a table or other support. This is not only time consuming but also limits the size, shape, or style of wheel upon which the device may operate since some wheels may not lend themselves to being clamped to the support. Furthermore, the manner of clamping employed by some devices may damage or mar decorative wheels such as so-called "Mag" wheels.

Many such devices heretofore used also require the operator to align the wheel and tire assembly with a bead loosener for subsequent loosening of the bead. Not only is this time consuming, but it is susceptible to operator error resulting in either tire, bead, or rim damage.

SUMMARY OF THE INVENTION

It is a primary object of this application to provide a wheel clamping and bead loosening device which overcomes the problems of the prior art noted above.

A wheel clamp and bead loosening device is set forth which automatically loosens the bead of the tire in a manner that eliminates rim or bead damage and which clamps the wheel along its rim for subsequent removal of the tire. This device is self-aligning and is therefore capable of performing the aforementioned operations upon the wheel and tire independent of the size, shape, or style of the wheel.

The wheel clamp and bead loosening device has a support such as a horizontal table to hold the wheel with a tire mounted thereon in a position for subsequent clamping and bead loosening. Upon the table there is located a plurality of shoes which can move radially, with respect to the wheel, simultaneously inward to engage the rim of the wheel. When the shoes contact the rim a pivoting tongue contained within each shoe is driven between the rim and the tire bead to loosen the bead from the rim.

It is an object of the invention to provide a wheel clamping and bead loosening device which loosens the tire bead at several locations around the rim by a method less likely to cause bead damage. The bead loosening tongues move radially between the rim and the bead thereby minimizing the stresses initially placed upon the bead as well as somewhat axially to move the bead off of its seat on the wheel.

Further objects and advantages of the invention will become apparent from the study of the following portion of the specification, the claims and the attached drawings.

DESCRIPTION

Figure 1:
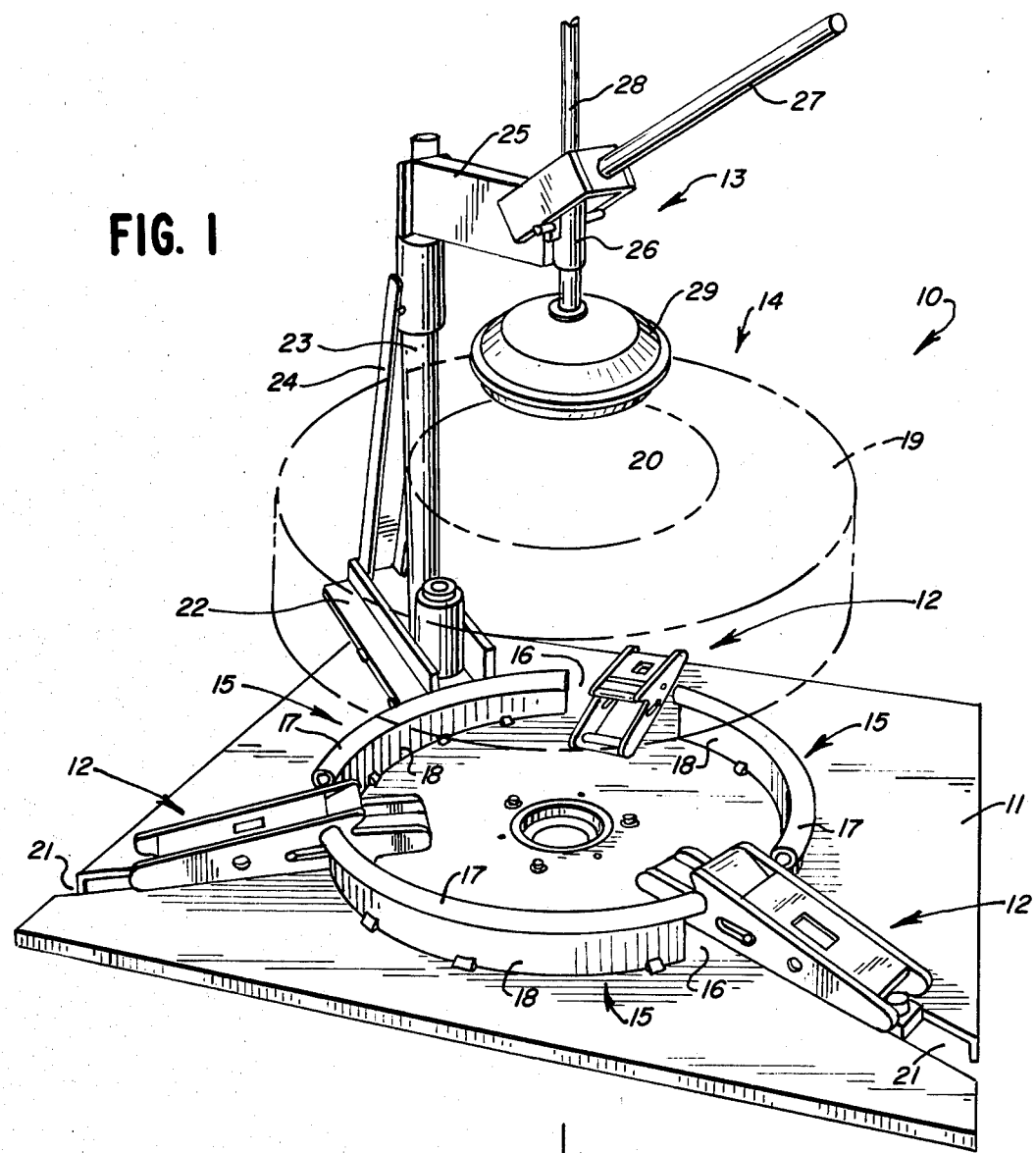
FIG. 1 is a perspective view of an embodiment of the invention with the shoe assemblies at their approximate midmost position.

Referring to the drawings, FIG. 1 shows the wheel clamping and bead loosening device 10. The device 10 is seen to consist mainly of a horizontal table 11, three movable shoe assemblies 12 located on the table 11 and a restraint 13 capable of moving downward toward the table 11 to hold a wheel assembly 14 (shown by broken lines) therebetween. It should be noted that the table 11 and the shoe assemblies 12 are essential to the operation of this embodiment of the device 10 while the restraint 13 is not. The weight or configuration of the wheel assembly 14 may be such that the device 10 can perform the functions hereinafter described without employing the restraint 13.

Figure 2:
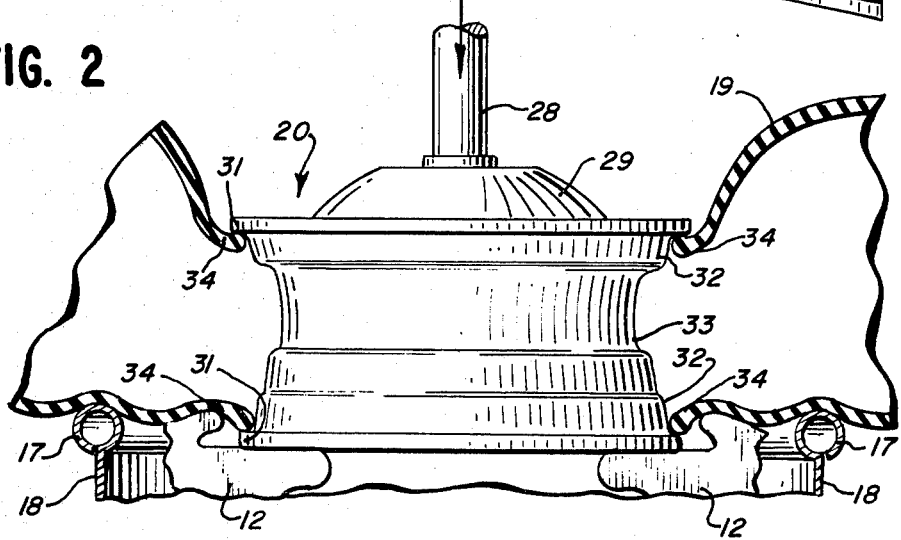
FIG. 2 is a side view of the wheel with the tire cutaway to show the shoe assemblies poised to engage the rim.
Figure 3:
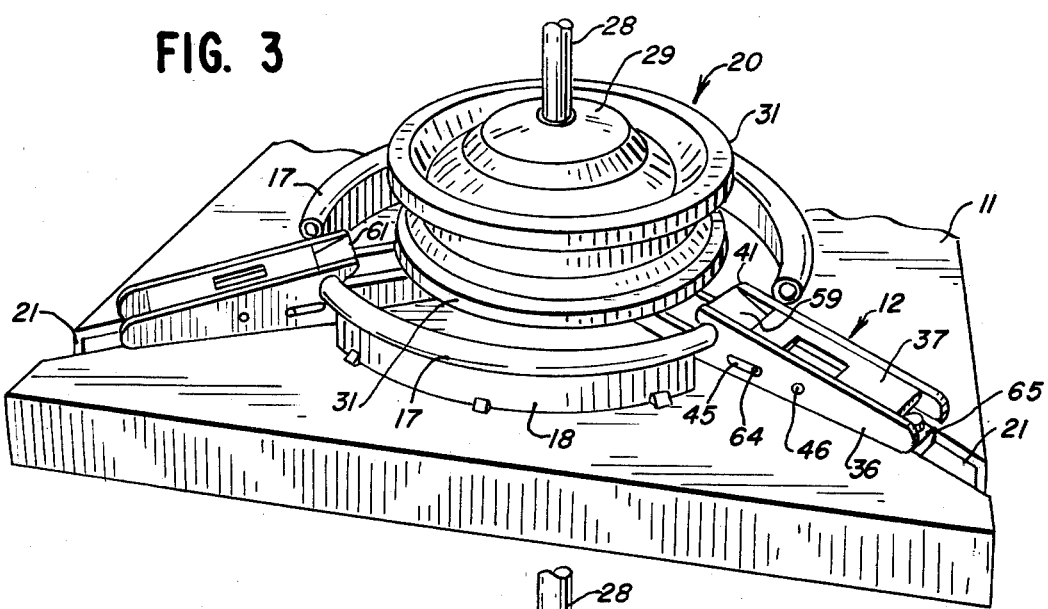
FIG. 3 is a view of the device showing the shoe assemblies prior to engagement with the rim with the tire omitted for clarity.
Figure 4:
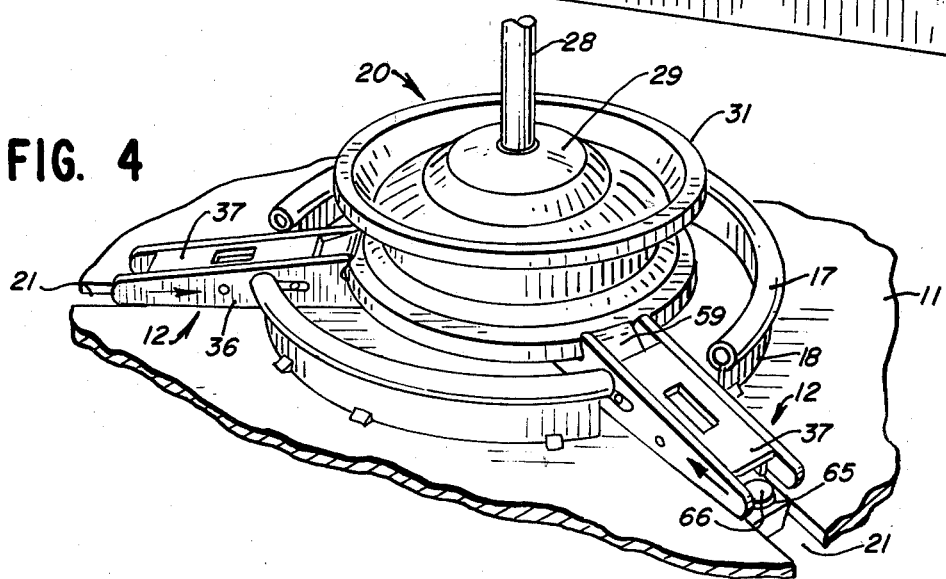
FIG. 4 is a view similar to FIG. 3 illustrating the shoe assemblies as they contact the rim of the wheel to clamp the same.
Figure 5:
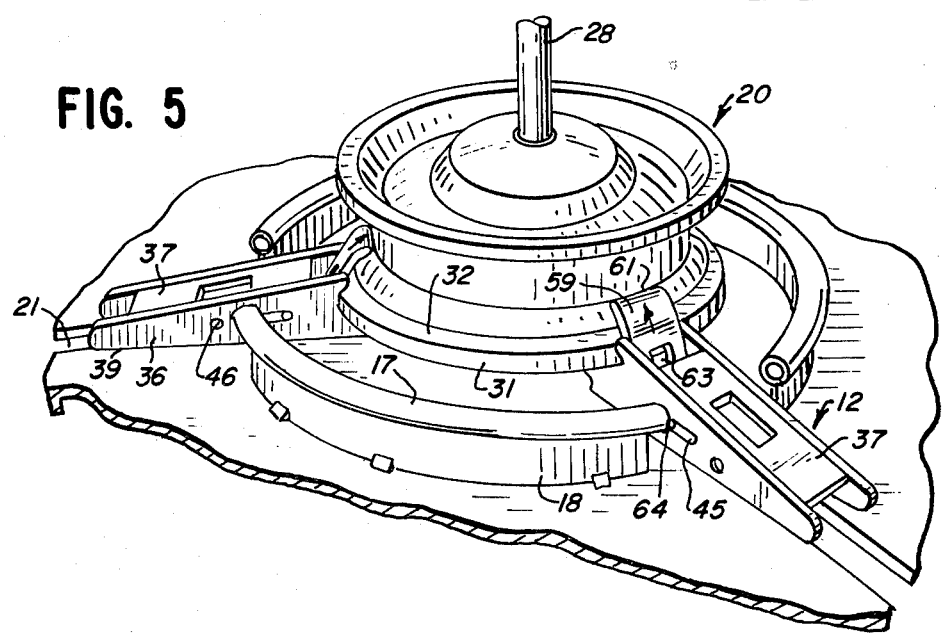
FIG. 5 is a view similar to FIGS. 3 and 4 illustrating the bead loosening tongues extending from the shoe assemblies to loosen a bead after clamping the wheel.
Figures 6, 7:
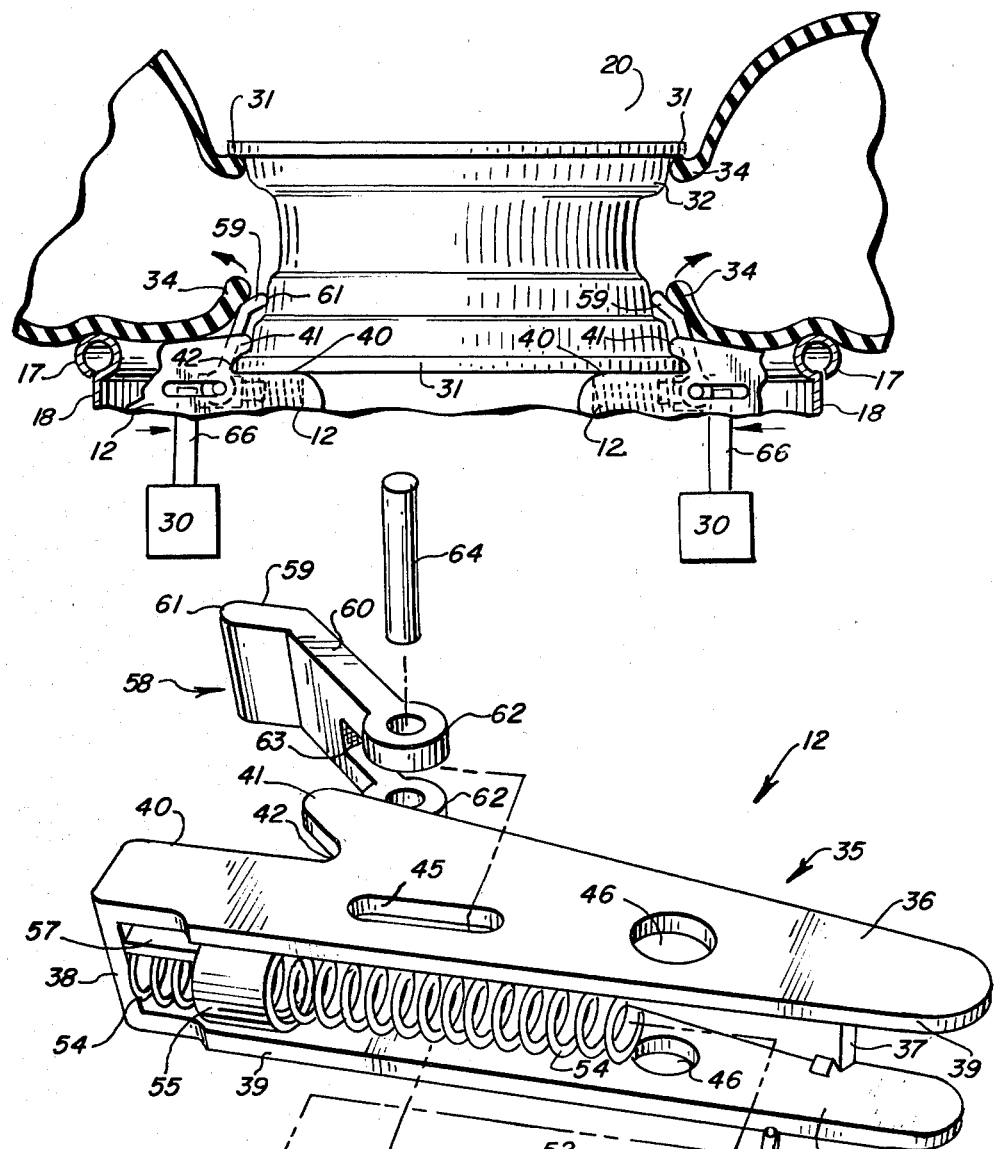
FIG. 6 is a side view of the wheel with the tire partially cutaway to show the engagement of the rim by the tongues.
FIG. 7 is an exploded view of a shoe assembly.

Viewing the table 11 in more detail, FIG. 1 shows the table 11, as mounting three identical support members 15. The support members 15 are arcuate, hving a common center coincident with the center of the table 11 and are spaced apart to form shoe passageways 16 of widths sufficient to allow the shoe assemblies 12 to pass therebetween. Each of the support members 15 consists of a tube 17 disposed above the table 11 by a vertical spacer 18. As can be seen in FIGS. 1, 2, and 6 when the wheel assembly 14 is placed upon the device 10, the tubes 17 of the support members 15 are contacted by the tire 19 of the wheel assembly 14 thereby suspending the wheel 20 above the table 11.

The table 11 includes three tracks 21 which extend from the edge of the table 11 radially towards its center. The tracks 21 guide the progression of the shoe assemblies 12 toward engagement with the wheel 20 and provide a means to transmit the force which will ultimately loosen the bead of the tire 19 and clamp the wheel 20 from a power source such as a hydraulic drive means 30 (see FIG. 6). Each track 21 has a width less than that of the shoe assembly 12 and extends toward the center of the table 11 a sufficient distance to allow, as will subsequently be described, the loosening of the bead of the tire 19 and the clamping of the wheel 20. Typically the terminus of each track 21 is well within the circle formed by the support members 15. It is of further note that the center line of each track 21 is colinear with the center line of the shoe passageways 16 which lie between the support members 15. The three tracks 21 are angularly spaced from one another by an angle of approximately 120°.

The restraint 13 is suspended above the middle of the table 11 by a base 22 firmly affixed to the table 11. A vertical post 23 is supported by a brace 24 which is affixed between the base 22 and the upper portion of the vertical post 23. The top of the vertical post 23 mounts one end of a support beam 25 for rotation about a vertical axis. The remote end of the beam 25 mounts a restraint mechanism 26 operated by a handle 27. Extending through the restraint mechanism 26 is a shaft 28 which in turn mounts a wheel engaging member 29. Operation of the handle 27 will drive the member 29 forcibly against an underlying wheel 20. A rack and pinion mechanism or air cylinder may be used for the purpose.

The typical wheel assembly 14 upon which the shoe assembly 12 will operate is best shown in FIGS. 2 and 6. The wheel 20 of the wheel assembly 14 has two outer rims 31 separated by a pair of bead shelves 32 which in turn extend to a drop center 33. The tire 19 is mounted on the wheel 20 by the sealing and retaining engagement of the circumferential tire beads 34 with the rims 31 and the bead shelves 32 as seen in FIG. 2.

Turning to FIG. 7 the structure of the shoe assemblies 12 is shown in more detail. Each shoe assembly 12 has a main body 35 formed by sidewalls 36 held apart by a top brace 37 and a frontal spring support 38. The identically shaped sidewalls 36 have flat edges 39 which slide along the table 11 and support the shoe assemblies 12 against tipping as they engage and clamp the rim 31. Opposing the flat edges 39, along the upper side of the shoe assemblies 12 a pair of rim seats 40 extend from the top of the spring supports 38 toward the rear of the shoe assemblies 12. The rim seats 40 are flat, parallel to the flat edges 39 and extend rearward for approximately one-third the length of the sidewalls 36. At the rear of the rim seats 40 are the projections 41 which extend from the rim seats 40 away from the flat edges 39 and somewhat toward the front of the shoe assemblies 12. The projection 41 and the rim seats 40 form angular rim notches 42 for receiving the rim 31.

Each shoe assembly 12 includes slot-like tongue guides 45 which are parallel to the flat edges 39 and disposed within the sidewalls 36 between the rim seats 40 and the flat edges 39 slightly to the rear of the rim notches 42. Medially between the tongue guides 45 and the rear of each sidewall 36 are located access bores 46 which provide access for the mounting of the shoe assemblies 12 to the table 11.

Within each shoe assembly 12 is a tongue support 47. As shown in FIG. 7 the tongue support 47 has a pair of legs 48 which are affixed to and extend from a pivot block 49. The legs 48 are of identical construction having flat sides 50 which will slidably bear upon the surface of the table 11 to support the tongue support 47 against tipping or pivoting about hole 52. Through the middle of each of the legs 48, are made mounting bores 51 and a pivot bore 52 penetrates the pivot block 49. Extending from the pivot block 49, opposing the legs 48, is a solid cylindrical spring mount 53.

Surrounding and extending from the spring mount 53 is a biasing means shown as a coil spring 54 having a relatively high spring rate. The opposing end of the coil spring 54 engages the spring support 38 which spans the sidewalls 36 at the front of the shoe assembly 12. To guide the compression of the coil spring 54 is a spring guide 55 which extends rearward from the spring support 38 to loosely encircle the coil spring 54. A pair of planar supports 57 hold the spring guide 55 away from the spring support 38.

Pivotally mounted within each shoe assembly 12 is a bead breaking tongue 58. The tongue 58 is composed of a flat wedge 59 having a width slightly less than the span between the sidewalls 36 of the shoe assembly 12 and having a rounded leading edge 61. Opposing the leading edge 61 and extending from the wedge 59 at an oblique angle is a pivot member 60 which is likewise planar and has, on its end opposing the wedge 59, a pair of pin mounts 62 separated by a tongue notch 63.

To mount the tongue 58 within the shoe assembly 12, the coil spring 54 is placed against the spring support 38 such that it extends outward through the spring guide 55. Inserting the spring mount 53 of the tongue support 47 into the free end of the coil spring 54, the coil spring 54 is partially compressed such that the pivot bore 52 is in line with the rearward most portion of the tongue guides 45. The tongue 58 is positioned within the shoe assembly 12 such that the pin mounts 62 are co-aligned with the tongue guides 45 and the pivot bore 52. A pivot pin 64 is inserted through the tongue guides 45, pin mounts 62 and the pivot bore 52, the pivot pin 64 having a length such that it protrudes from the sidewalls 36 to firmly hold the pin 64 securely within the shoe assembly 12. In this position the leading edge 61 of the tongue 58 is approximately co-linear with the tips of the projections 41. This orientation of the leading edge 61 is maintained since the tongue notch 63 rests upon the coil spring 54 and the pivot member 60 abuts the top brace 37.

As shown in FIG. 7, within each track 21 of the table 11 there is slidably located a shoe drive member 65. The shoe drive member 65 is connected to any conventional drive means 30 through a drive pin 66 to provide for simultaneous advancement or retraction of the shoe assemblies 12. Extending from the shoe drive member 65 is a shoe mount 67. The shoe mount 67 has a mounting pin receiving bore 68 which extends through the shoe mount 67 transverse to the track 21.

To mount the shoe assembly 12 upon the table 11 and to the shoe drive member 65, the shoe assembly 12 is placed upon the surface of the table 11 such that the flat edges 39 and the flat sides 50 of the tongue support legs 48 lie upon the surface and the mounting bores 51 in the tongue support 47 are aligned with the mounting pin receiving bore 68. A mounting pin 69 is inserted through one of the access bores 46 into the mounting bores 51 and the mounting pin receiving bore 68 to pin the tongue support 47 to the shoe drive member 65.

With the above structure in mind the operation of the device 10 can be set forth. The wheel assembly 14 is placed upon the table 11 such that the deflated tire 19 lies on the tubes 17 of the support members 15. The wheel assembly 14 may or may not be held to the table 11 by the restraint 13 as desired.

Actuating the drive means 30 moves the shoe drive members 65 simultaneously toward the center of the table 11. This movement is translated through the mounting pin 69, tongue support 47 and coil spring 54 to the spring support 38. Because of their high spring rates, the coil springs 54 are not compressed and act as rigid members to push the shoe assemblies 12 toward the wheel assembly 14 at this stage in the operation.

The converging of the shoe assemblies 12 halts as the rim 31 is received in the notches 42 as shown by FIG. 2. Should less than all of the assemblies 12 engage the rim 31 at a given time, those engaged with the rim 31 will shift the wheel 20 on the table 11 until all assemblies 12 are so engaged thereby automatically centering the wheel 20 on the table 11. As the shoe drive members 65 continue to converge, the restraint against further movement of the projections 41 posed by the wheel 20 results in the compression of the coil spring 54, the movement of the tongue support 47 within the main body 35, and the extension of the tongue 58 from the main body 35.

The extension of the tongues 58 is, at first, radial as the leading edges 61 wedge between the tire bead 34 and the rim 31 to contact the bead shelf 32. The tongues 58 then pivot as the leading edges 61 follow the contour of the bead shelf 32 and drop center 33. As shown in FIG. 6, the pivoting of the tongue 58 loosens the tire bead 34 from the bead shelf 32 for subsequent removal of the tire 19 from the wheel 20. As the tire bead 34 is loosened from the wheel 20, the projections 41 move over the rim 31 to firmly secure the wheel 20 within the rim notches 42 if such action has not previously occurred.

While, as described above, it is preferable that each shoe assembly 12 contain a bead loosening tongue 58 to maximize the locations at which the bead 34 is loosened, the device 10 can also function where only one or some of the shoe assemblies 12 have a tongue 58. For example, in the device 10 described above, only one or two of the three shoe assemblies 12 may have a tongue 58. Or, should the device 10 have four shoe assemblies 12 spaced by 90°, then one or more of the shoe assemblies 12 may possess bead loosening tongues 58.

I claim:

1. A device for clamping a wheel and loosening the bead of a tire attached thereto, comprising:
   a table to hold a wheel and tire;
   a plurality of radially converging shoes located on said table and having means for clamping a wheel to said table;
   a tongue extensible from at least one of said shoes; and
   motor means for sequentially moving said shoes towards clamping engagement with a wheel and thereafter extending said tongue between a wheel and a tire bead to loosen the tire bead from the wheel.

2. A device as described in claim 1 wherein said moving means further comprises:
   a support within and movable relative to each of said shoes, said support also pivotally mounting said tongue;
   interconnecting means between said supports and said shoes whereupon said supports and shoes move unitarily until the shoes engage the wheel, thereafter the supports move relative to said shoes causing the shoes to clamp said wheel and the tongue to be inserted between the wheel and tire bead; and
   drive means connected to said supports to impart motion to said shoes to clamp said wheel and thereafter relative motion to said supports.

3. A device as described in claim 2 wherein said interconnecting means is a spring having a sufficiently high spring rate such that said supports cannot move relative to said shoes until said shoes have engaged the wheel.

4. A device for clamping a wheel about the rim and loosening the bead of a tire attached thereto comprising:
   a table to support the wheel and tire;
   a plurality of wheel clamping shoes located on said table which are movable so as to radially converge and clamp upon the rim of the wheel;
   a support within and movable relative to each of said shoes, the relative motion being radial with respect to the wheel;
   a tongue pivotally located on at least one support;
   a biasing means interconnecting said support with said shoe to restrain relative motion until the movement of said shoes is impeded; and
   a means connected to said support to converge said shoes toward said rim whereby said shoes move toward said rim until impeded thereafter said biasing means is overcome causing said shoes to clamp said wheel and said tongue to pivot and be inserted between said bead and said rim to loosen the bead from the wheel.

5. A device as described in claims 1 or 4 wherein said shoes are spaced equally apart.

6. A device as described in claim 4 wherein said shoes have projections thereon to clasp the rim, said tongues extending from said projections.

7. A device as described in claim 4 wherein the biasing means is a spring.

8. A device for clamping a wheel about its rim and loosening the bead of a tire attached thereto comprising:
   a table having a support thereon to hold the tire and wheel above said table;
   a plurality of tracks on said table extending radially toward said wheel;
   a drive member movable along said tracks;
   a shoe slidable along said tracks having a projection thereon to hook the rim;
   a support member connected to said drive member;
   a biasing means interconnecting said support to said shoe;
   tongues mounted to at least some of said supports so as to pivotably extend from the projection; and
   means to move said drive members, supports and shoes convergingly along said tracks until the projections encounter sufficient resistance to result in the relative movement of the support against the biasing means causing said projections to firmly clasp the rim therebetween and said tongues to pivot and extend between the rim and the tire to loosen the bead of the tire.

9. A device as described in claim 8 having a restraint to press said wheel towards the table.

10. A device as described in claim 8 having three tracks spaced apart by 120°.

11. A device as described in claim 10 having a tongue mounted to each support.

12. A device as described in claim 8 having four tracks spaced apart by 90°.

13. A device as described in claim 8 wherein said biasing means is a spring.

* * * * *